(12) United States Patent
Diab

(10) Patent No.: US 8,325,892 B2
(45) Date of Patent: Dec. 4, 2012

(54) SYSTEM AND METHOD FOR CONFIGURING A CUSTOMER PREMISES EQUIPMENT IN A SERVICE PROVIDER NETWORK

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 940 days.

(21) Appl. No.: 11/925,718

(22) Filed: Oct. 26, 2007

(65) Prior Publication Data

US 2008/0289016 A1 Nov. 20, 2008

Related U.S. Application Data

(60) Provisional application No. 60/917,769, filed on May 14, 2007.

(51) Int. Cl.
*H04M 1/56* (2006.01)
(52) U.S. Cl. ............ 379/142.12; 379/93.05; 726/4
(58) Field of Classification Search ... 726/4; 379/93.05, 379/142.12
See application file for complete search history.

(56) References Cited

U.S. PATENT DOCUMENTS

| | | | |
|---|---|---|---|
| 6,438,384 B1* | 8/2002 | Chen | 455/462 |
| 2001/0019559 A1* | 9/2001 | Handler et al. | 370/468 |
| 2002/0048283 A1* | 4/2002 | Lin | 370/495 |
| 2003/0206542 A1 | 11/2003 | Holder | |
| 2004/0136712 A1 | 7/2004 | Stiscia et al. | |
| 2004/0174979 A1* | 9/2004 | Hutton et al. | 379/265.02 |
| 2004/0208151 A1* | 10/2004 | Haverinen et al. | 370/338 |
| 2004/0218748 A1* | 11/2004 | Fisher | 379/221.01 |
| 2004/0259541 A1* | 12/2004 | Hicks et al. | 455/426.1 |
| 2005/0027888 A1 | 2/2005 | Juszkiewicz | |
| 2005/0047497 A1 | 3/2005 | Rubinstein et al. | |
| 2007/0060133 A1* | 3/2007 | Spitzer et al. | 455/445 |
| 2008/0144821 A1 | 6/2008 | Armstrong | |
| 2008/0235763 A1* | 9/2008 | Krantz et al. | 726/2 |
| 2008/0240089 A1* | 10/2008 | Jiang et al. | 370/357 |
| 2008/0285545 A1* | 11/2008 | Diab et al. | 370/352 |
| 2008/0285546 A1* | 11/2008 | Diab et al. | 370/352 |
| 2010/0241748 A1* | 9/2010 | Ansari et al. | 709/225 |

OTHER PUBLICATIONS

Chang et. al. "Rapid Deployment of CPE-Based Telecommunications Services", Dec. 2, 1994, Global Telecommunications Conference, 1994. Globecom '94. Communications: The Global Bridge., IEEE, pp. 876-880 vol. 2.*
Broadcom BCM54880 Product Brief, Octal 10/100/1000BASE-T Gigabit Ethernet BroadR-ReachTM Transceiver, Jun. 18, 2007.
Newton, Harry, Newton's Telcom Dictionary, p. 878, 19 ed., San Francisco, CMP, 2003.
Home Network Pro—WAN Information, Apr. 9, 2005.

* cited by examiner

*Primary Examiner* — Kambiz Zand
*Assistant Examiner* — Michael Guirguis
(74) *Attorney, Agent, or Firm* — Duane S. Kobayashi

(57) ABSTRACT

A system and method for authentication for configuring a customer premises equipment (CPE) in a service provider network. In a multiple dwelling unit (MDU) a customer device (e.g., voice over Internet protocol (VOIP) phone) can be configured with CPE functionality, thereby enabling the customer device CPE to support the provision of service to multiple additional customer devices in a customer premises. A dedicated CPE device is thereby eliminated from the service provider network. The customer device CPE can be designed to support a form of authentication (e.g., Layer 2, Layer 3) that would be sufficient for access by the multiple additional customer devices to various network services.

20 Claims, 5 Drawing Sheets

SYSTEM AND METHOD FOR CONFIGURING A CUSTOMER PREMISES EQUIPMENT IN A SERVICE PROVIDER NETWORK

This application claims priority to provisional application No. 60/917,769, filed May 14, 2007, which is incorporated by reference herein, in its entirety, for all purposes.

BACKGROUND

1. Field of the Invention

The present invention relates generally to service provider networks and, more particularly, to a system and method for configuring a customer premises equipment (CPE) in a service provider network.

2. Introduction

Incumbent local exchange carriers (ILEC) and competitive local exchange carriers (CLECS) are seeking to capitalize on the growing market for broadband Internet connections to the home. One example of an ILEC Internet service is a digital subscriber line (DSL) service, which provides a broadband connection over a conventional copper twisted pair. Recent ILEC offerings have enhanced the bandwidth of connections to the home using fiber optic technology. Hybrid solutions also exist where fiber optic solutions are combined with copper twisted pairs from a curbside or other remote terminal. These ILEC offerings are seeking to compete with cable providers that provide broadband connections using their existing coaxial cable TV infrastructure.

Regardless of the method of connection to the customer, the connections terminate on customer premise equipment (CPE). Examples of CPEs include a DSL or cable modem, set top boxes, or the like. In general, the CPE is a terminal and associated equipment and inside wiring located at a subscriber's premises and connected with a carrier's communication channel(s) at the demarcation point. The demarcation point is a point established in a building or complex to separate customer equipment from the carrier's equipment. In one example, a CPE is responsible for performing media conversion, switching, security, provisioning, etc.

One of the major markets of competition for ILEC and CLECS are multiple dwelling units (MDUs) such as apartment complexes, office buildings, high-rise complexes, etc. This MDU market has vast potential due to the density of the customer base. In servicing such a market, it is important that the delivery of services to individual customer premises be accomplished in a cost-effective manner. What is needed therefore is a CPE authentication framework that minimizes the cost of delivering services to customer devices in a customer premises.

SUMMARY

A system and/or method for configuring a CPE in a service provider network, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Unlike suburban residential markets, the MDU market can benefit greatly from economies of scale. Notwithstanding the economies of scale, the MDU market can still benefit from the efficient and cost-effective delivery of services to individual customer premises be accomplished. Traditionally, the delivery of services to individual customer premises is based on the deployment of dedicated customer premises equipment (CPE), which can be configured to perform media conversion, switching, security, provisioning, etc. An example of such a dedicated CPE is a DSL modem, which can be used to support such customer devices as a voice over Internet protocol (VOIP) phone, a computer, a wireless access point, a television, a high definition receiver, etc.

Dedicated CPEs represent one of the most significant components of the expense in delivering services to a customer premises. It is therefore a feature of the present invention that a new CPE framework can be created wherein dedicated CPE devices are eliminated. In one embodiment of the present invention, a customer device (CD) such as a VOIP phone, an IP TV receiver, etc. can be designed to incorporate CPE functionality such as strong authentication, thereby enabling the CD to operate concurrently as a CPE and as a CD. In this manner, the CD CPE obviates the need for stand alone CPE devices.

Figure 1:
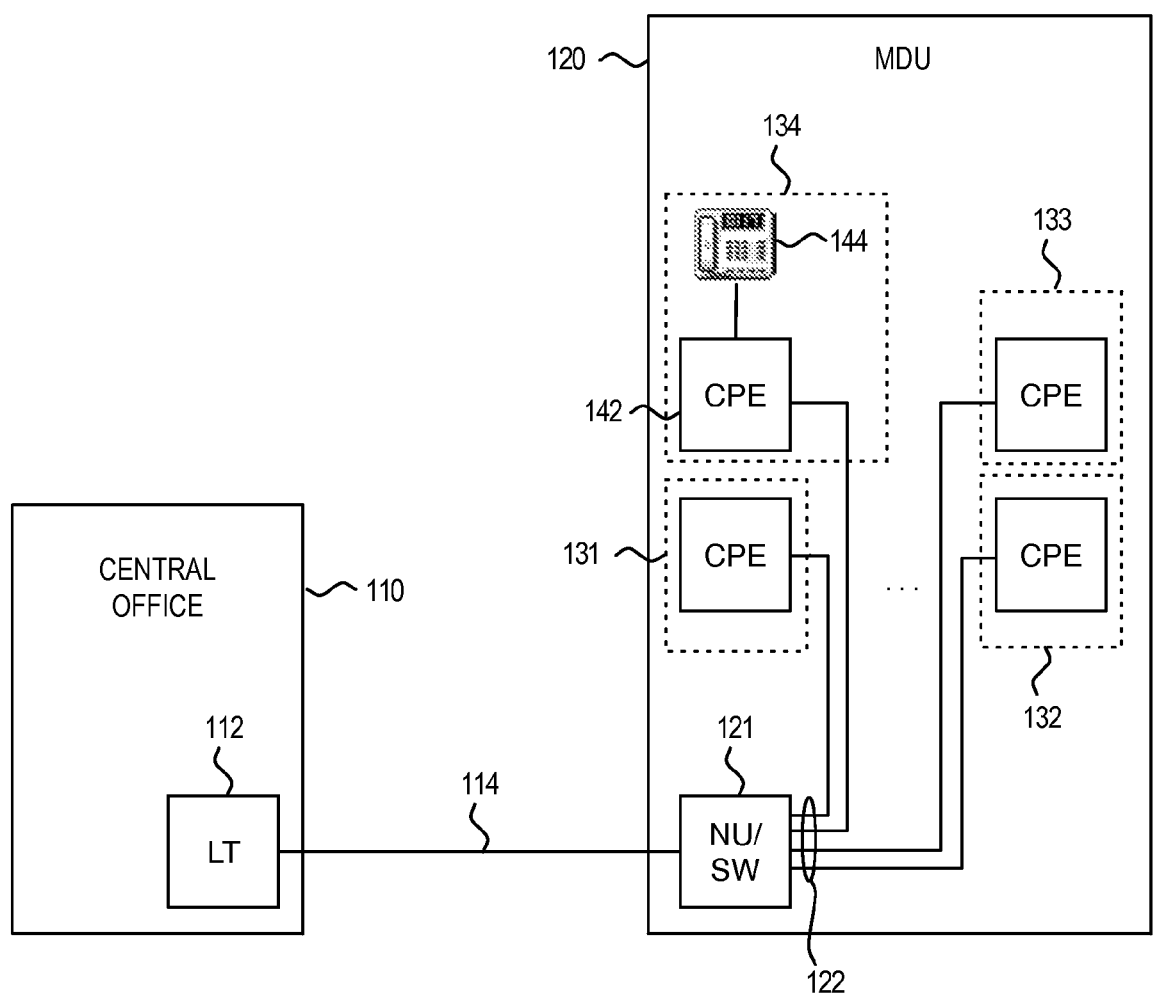
FIG. 1 illustrates an example of a system that services a MDU complex.

To illustrate these features of the present invention, reference is now made to FIG. 1, which illustrates a conventional system architecture for provisioning service to multiple customer premises in an MDU. In this illustrated example, the MDU service is supported by central office 110 (or other hub location). Although not shown, central office 110 is itself connected with other central offices and hubs through a broader communications network. In one embodiment, central office 110 is connected to MDU 120 via a high bandwidth connection between line terminal (LT) 112 in central office 110 and network unit (NU) 121 in MDU 120. In one scenario, NU 121 is located in a basement of MDU 120. In various implementations, link 114 can be embodied as a copper link, fiber optic link, etc. Moreover, in one embodiment, LT 112 is positioned as a remote terminal in a location that is remote from central office 110.

NU 121 in MDU 120 can be configured to perform a media conversion. For example, NU 121 can perform a media conversion from fiber optic cabling to copper cabling. In the illustrated example, NU 121 can support multiple CPEs in MDU 120 via a plurality of links 122. In a typical high-rise building, the plurality of links can extend from the basement to customer premises 131-134 on various floors in MDU 120.

In one configuration, the connection between NU 121 and individual dedicated CPEs is via a copper connection. In various embodiments, this copper connection can be based on standard Ethernet, DSL, or the like. In various implementations, the copper DSL connection can be Ethernet (e.g., 2BASE-TL and 10PASS-TS) or non-Ethernet based.

As illustrated, NU 121 also incorporates switching (SW) functionality that aggregates a plurality of links into a single uplink. NU 121 can also effect various network policies. For example, NU 121 can enforce various bandwidth limitations in accordance with service provisioning under a particular service level agreement (SLA).

As illustrated in FIG. 1, each customer premises 131-134 has a dedicated CPE. Each dedicated CPE can in turn support one or more CDs. For example, CPE 142 in customer premises 134 supports VOIP phone 144.

Figure 2:
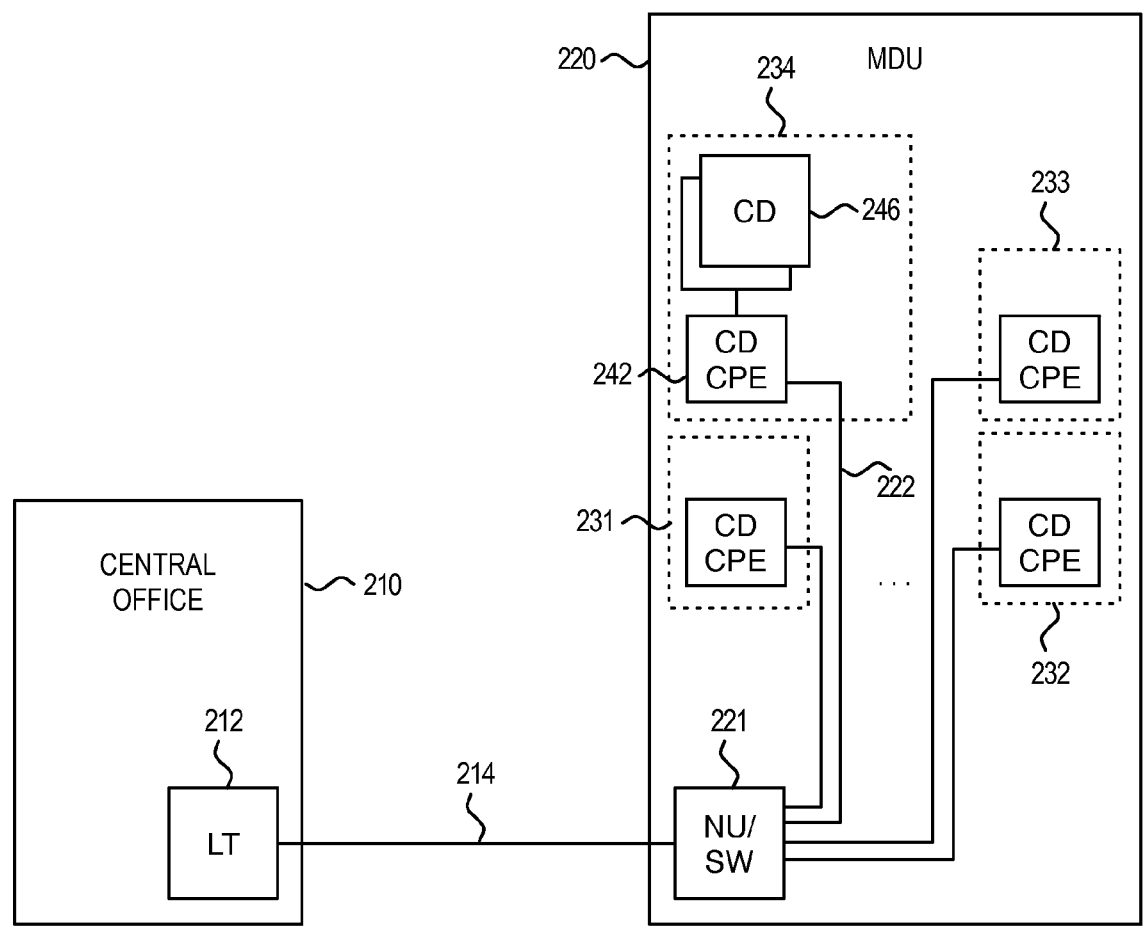
FIG. 2 illustrates an embodiment of a system that services a MDU complex.

In accordance with the present invention, the reliance on dedicated CPEs is eliminated through the creation of a new CPE framework. Here, a CD is configured with authentication, privacy and security functionality to thereby enable a CD to operate concurrently as a CPE. FIG. 2 illustrates a system architecture of a CPE framework in accordance with the present invention. In the illustrated example, a high-bandwidth connection such as fiber-optic link 214 is supported by LT 212 in central office 210 and NU 221 in MDU 220. Unlike the system architecture of FIG. 1, links from NU 221 to customer premises 231-234 are not supported by conventional CPEs. Rather, the conventional CPE such as a DSL modem is eliminated from the system architecture. Instead, the links from NU 221 to customer premises 231-234 can be supported by a CD CPE device. An example of such a CD CPE device is a VOIP phone. Each CD CPE device can in turn support other CDs. For example, in customer premises 234, CD CPE 242 (e.g., VOIP phone) can be used to support the delivery of services to other CDs 246 (e.g., personal computers, wireless access points, televisions, HD receivers, etc.). These additional CDs can be coupled to CD CPE 242 via a separate link (e.g., Ethernet).

In the system architecture of FIG. 2, each CD CPE can be coupled to NU 221 via a wall socket connection. As noted, this connection can be based on standard Ethernet, DSL, fiber optic, or the like. DSL connections can be Ethernet (e.g., 2BASE-TL and 10PASS-TS) or non-Ethernet based. In one embodiment, support for a customer premises near the top of a high-rise building can be based on a broad reach Ethernet connection that can handle link spans as long as 500 meters and beyond. An example of such a broad reach Ethernet transceiver is Broadcom's BroadR-Reach™ transceivers.

An advantage of such a broad reach connection is that frames can be carried natively in Ethernet. This is advantageous because NU 221 can be based on a conventional enterprise switch box not a DSL box, and a frame format conversion such as that performed by a DSL modem at the CPE would not be required. Moreover, the switch chips inside NU 221 are standard devices that can enjoy high volume efficiencies. In general, broad reach Ethernet extends the physical transmission capabilities of Ethernet but preserves the PCS, RS, MAC and above as native Ethernet. Broad reach Ethernet is also backwards compatible with standard Ethernet.

In general, the CD CPE can be built with functionality similar to personal computers. For example, CD CPE can have a central processing unit (CPU), a switch, router, and software/firmware that can define its configuration and functionality. In one embodiment, the CD CPE is embedded with CPE functionality such as encryption, authentication, provisioning, packet inspection, router, network address translation, USB support, prioritization, audio/video bridging, etc. This embedded functionality would enable the CD CPE to operate in a capacity similar to a conventional CPE.

Figure 3:
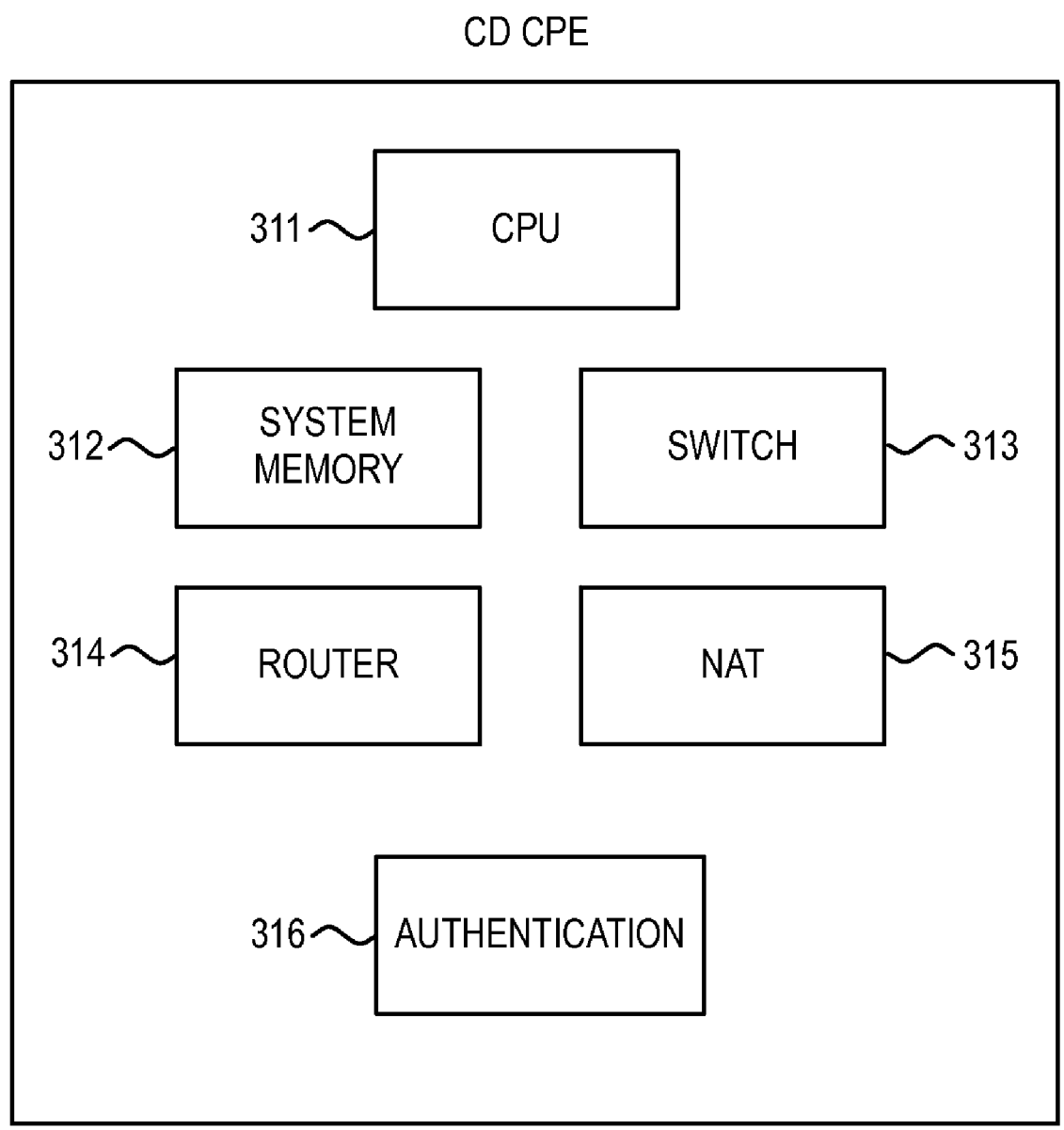
FIG. 3 illustrates an embodiment of a customer device having CPE functionality.

FIG. 3 illustrates an example of a CD CPE. As would be appreciated, various bus/bridge architectures (e.g., north/south bridge architectures) can be used to connect the various components in the system. As illustrated, CD CPE can include conventional components such as CPU 311 and system memory 312. The CD CPE would also include CD functionality (not shown). For example, a VOIP CPE can include CD functionality such as VOIP phone functionality. Here, the VOIP CPE would further include a display, codec, and keypad. The display can be embodied as an LCD screen for dialing and other call control/notification functions. The codec would support the conversion of an audio signal from/to a digital bitstream in the downstream/upstream directions. As such, the codec can be coupled to an amplifier that supports a speaker and microphone for VOIP communication. Finally, the keypad would enable the user input of dialing instructions. In combination, the display, codec, and keypad would support the VOIP function of the VOIP CPE.

Figure 4:
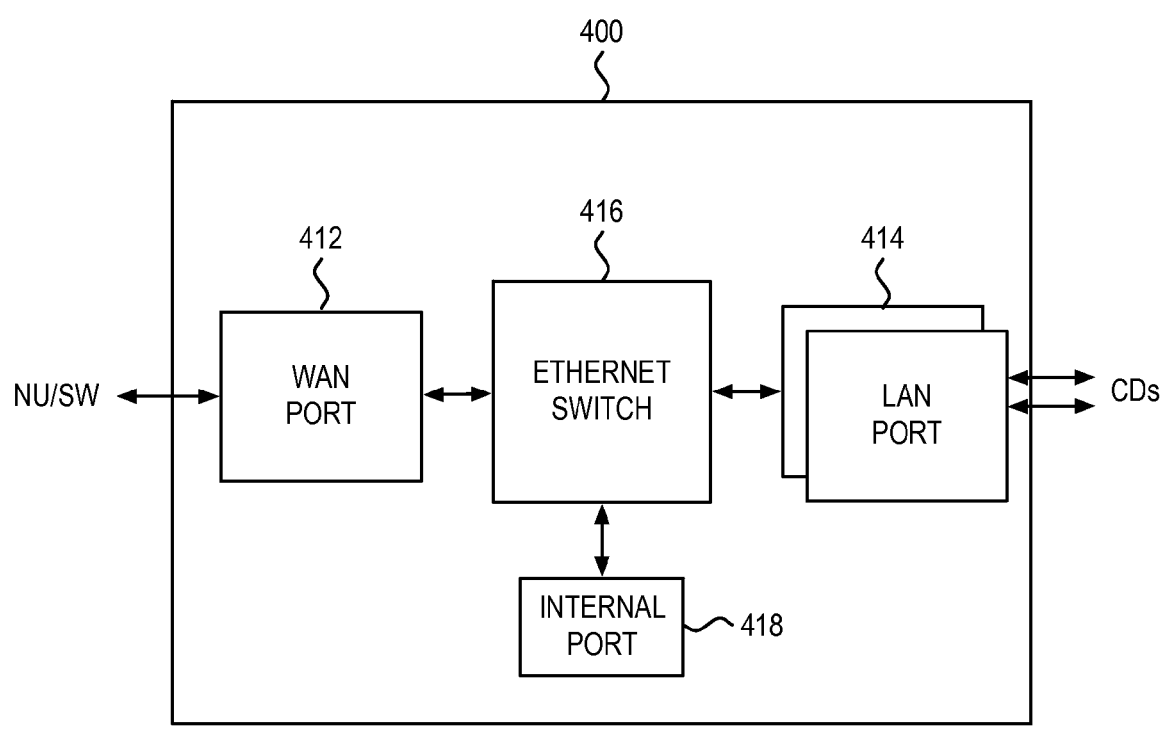
FIG. 4 illustrates CPE functionality in a customer device.

As noted, the CD CPE can support multiple additional CDs in the customer premises. In FIG. 3, this support is enabled by switch 313, router 314, and network address translation (NAT) 315 functionality. In combination, switch 313, router 314, and NAT 315 enable the CD device to operate as a CPE for one or more additional CDs. FIG. 4 illustrates an example of such CPE functionality. As illustrated, CD CPE 400 includes WAN port 412 for connection to an NU/SW, one or more LAN ports 414 for connection to one or more additional CDs, and internal port 418. In various embodiments, WAN port 412 can include the appropriate physical layer to support the interface required by the service provider (e.g., Ethernet, DSL, Ethernet on DSL, broad reach Ethernet, fiber optic, etc.). In general, WAN port 412, LAN port(s) 414 and internal port 418 support full duplex links such that traffic can be coming from either direction at the same time. Traffic can also be switched to two ports simultaneously. For example, internal port 418 can add traffic to WAN port 412 (e.g., VOIP traffic) and LAN port(s) 414, or receive traffic from either or both of WAN port 412 and LAN port(s) 414. WAN port 412, LAN port(s) 414, and internal port 418 are coupled together via switch 416. In routing traffic from WAN port 412 to LAN port(s) 414, CD CPE 400 would support a CPE switching functionality for the customer premises.

As illustrated in FIG. 3, the CD CPE can also be designed to support some form of authentication, privacy and security, which would be used to prevent unauthorized devices from accessing the link at other points. In one embodiment, privacy/security can be enabled by encryption (e.g., MACSec), which would ensure that transmitted data (e.g., voice data) cannot be monitored by third parties. By validating exactly what services (e.g., IPTV, VOIP, data, etc.) are allowed to the CD CPE, the system can ensure that services are not stolen.

It is a feature of the present invention that a CD CPE can be configured with authentication module 316. In general, authentication module 316 would be designed to indicate to the network that the CD CPE is a valid network device that can receive communication services from the NU.

In one embodiment, authentication module 316 in the CD CPE would support Layer 2 authentication such as media access control (MAC) address authentication. In an alternative embodiment, authentication module 316 in the CD CPE would support Layer 3 authentication. In this embodiment, the IP address of the CD CPE can be authenticated such as by a username/password so that all additional CDs behind the CD CPE need not be individually authenticated.

As noted, the incorporation of authentication module 316 into the CD CPE enables the CD CPE to obviate the need for a dedicated CPE in a customer premises. One of the most expensive pieces of the MDU service delivery infrastructure is thereby eliminated.

As described, authentication module 316 can also be designed to operate using various authentication techniques (e.g., Layer 2, Layer 3, or the like). It should be noted that the particular authentication technique that is chosen would be implementation dependent. In one scenario, the particular authentication technique can be designed to cooperate with the provisioning scheme implemented in the NU. Regardless, it is significant that a device can be configured with an authentication module such that the device can operate as a CPE in a customer premises either as a standalone CD, or as a gateway for additional CDs in the customer premises.

Figure 5:
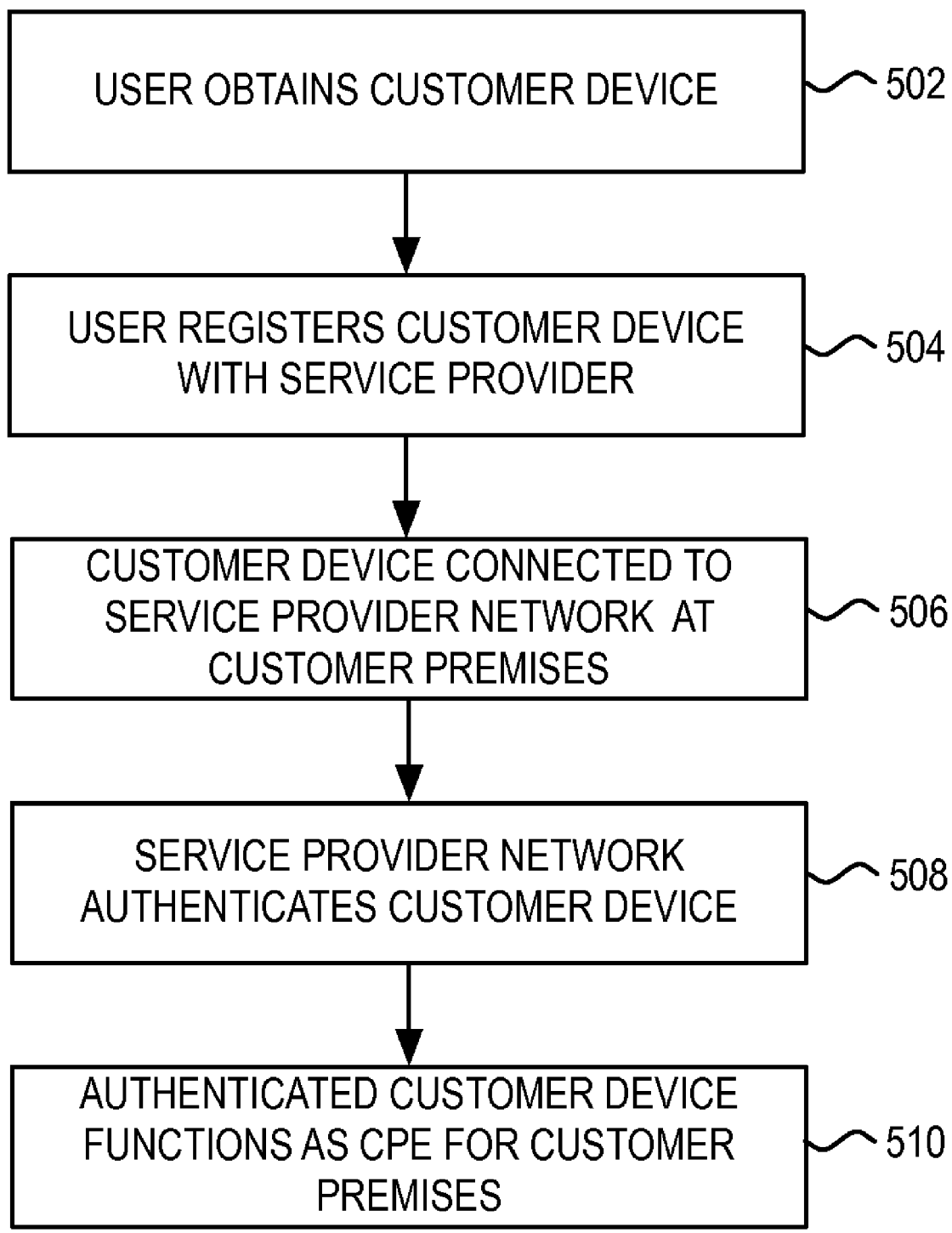
FIG. 5 illustrates a flowchart of a process of configuring a CPE in a service provider network.

To illustrate this feature of the present invention, reference is now made to the flowchart of FIG. 5. As illustrated, the process begins at step 502, where a user obtains a CD that can support CPE functionality. As noted above, examples of such a CD include a VOIP phone, IP TV receiver, a computer, etc. Next, at step 504, the user registers the CD with a service provider. As would be appreciated, registration of a CD with a service provider would necessitate the CD being supported by the service provider. In a consumer context, this support can be based on a list of compatible devices that are pre-approved or otherwise supported by the service provider. More specifically, the list of compatible devices would include the appropriate physical layer interface required by the service provider network, as well as the hardware and software engines that can support the CD's CPE functionality (e.g., switching, authentication, etc.).

In one embodiment, the CD registration with the service provider is facilitated by through a service provider portal such as a website. As part of this process, the user can provide the service provider with a MAC address of the CD. In scenario, the CD registration with the service provider is based on the provision of a username/password that is associated with the CD. As part of the registration process, the user can also receive configuration information (e.g., software, activation codes, etc.) that can be installed or used to otherwise activate the CD. In one scenario, the CD can be obtained as a generic device that can be configured to operate in a CPE capacity in an identified service provider network.

After registration and setup of the CD is complete, the process then continues to step 506 where the CD is connected to the service provider network at the customer premises. As this connection is not dependent on a separate standalone CPE device, the CD CPE can be connected to the network through a wall-socket connection. Here the physical interface of the wall-socket connection would be supported by the CD CPE.

Upon connection, the service provider network would then proceed to authenticate the CD at step 508. This authentication can be a strong authentication that is based on Layer 2 or Layer 3 techniques supported by the authentication module in the CD. As would be appreciated, a secure link can also be established through encryption if needed. For example, the CD can also be designed to support virtual private networks (VPNs) for enterprise purposes.

After the CD is authenticated, the CD can then be used as a CPE for the customer premises at step 510. In addition to operating its own CD functionality, the CD can also support multiple additional CDs in the customer premises using its switching, routing and NAT functionality.

In general, this described process gives the service provider maximum flexibility in configuration of the network. Cost reduction is also a significant benefit as the CPE functions have been consolidated into a CD, essentially outsourcing the management of CPEs to the consumer market. Operational costs in the service provider network are thereby reduced.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A voice over Internet protocol telephone, comprising:
 a housing that supports:
  a telephone keypad;
  a telephone handset for display of audio based on voice over Internet protocol traffic; and
  a display screen for display of dialing, call control, and call notification functions of said voice over Internet protocol telephone;
 said housing containing:
  a wide area network port that is configured for coupling to a service provider network unit via a first network cable;
  a local area network port that is configured for coupling to a second device via a second network cable;
  a switch that is coupled to said local area network port, said wide area network port and an internal port of said voice over Internet protocol telephone, wherein said switch is configured to route voice over Internet protocol traffic that originates at said internal port to said wide area network port for delivery to said service provider network, said switch being further configured to support a gateway function in forwarding network traffic received from said service provider network unit at said wide area network via said first network cable to said local area network port for delivery to said second device via said second network cable; and
  an authentication module that authenticates said voice over Internet protocol telephone with said service provider for registration of said voice over Internet protocol telephone to provide said gateway function, wherein said enabling of said gateway function is conditioned on said authentication.

2. The voice over Internet protocol telephone of claim 1, wherein said second device is a wireless access point.

3. The voice over Internet protocol telephone of claim 1, wherein said second device is a television.

4. The voice over Internet protocol telephone of claim 1, wherein said second device is a computer.

5. The voice over Internet protocol telephone of claim 1, wherein said second device is a high definition receiver.

6. The voice over Internet protocol telephone of claim 1, wherein said authentication is a Layer 2 authentication.

7. The voice over Internet protocol telephone of claim 1, wherein said authentication is based on a media access control address authentication.

8. The voice over Internet protocol telephone of claim 1, wherein said authentication is a Layer 3 authentication.

9. The voice over Internet protocol telephone of claim 1, wherein said authentication is based on a username and password.

10. The voice over Internet protocol telephone of claim 1, wherein said authentication is performed via a service provider website.

11. A method that enables use of a voice over Internet protocol telephone as a customer premises equipment, said voice over Internet protocol telephone having a housing that supports a telephone keypad, a telephone handset for display of audio, and a display screen for display of dialing, call control, and call notification functions of said voice over Internet protocol telephone, the method comprising:
- registering said voice over Internet protocol telephone with a service provider website, said registering including a provision of activation information, said registering enabling said voice over Internet protocol telephone to function as a customer premises equipment, wherein prior to said registering, said voice over Internet protocol telephone is unable to facilitate network services for a second device;
- sending, via an authentication module contained within said housing, authentication information from said registered voice over Internet protocol telephone to a wide area network port that is contained within said housing, said wide area network port being coupled to a service provider network unit via a first network cable, said authentication information enabling a determination by said service provider that said registered voice over Internet protocol telephone can receive network communication services;
- receiving network traffic on said wide area network port of said registered voice over Internet protocol telephone after authentication of said registered voice over Internet protocol telephone; and
- routing said network traffic to said second device via a switch and a local area network port contained within said housing, said local area network port being coupled to said second device via a second network cable.

12. The method of claim 11, wherein said authentication is a Layer 2 authentication.

13. The method of claim 11, wherein said authentication is a Layer 3 authentication.

14. The method of claim 11, wherein said routing comprises routing to one of a wireless access point, television, computer, and high definition receiver.

15. The method of claim 11, wherein said registering comprises receiving software to be installed on said registered voice over Internet protocol telephone.

16. The method of claim 11, wherein said registering comprises receiving an activation code.

17. A voice over Internet protocol telephone device, comprising:
- a housing that supports a display screen for display of dialing, call control and call notification function, said housing containing:
  - a wide area network port that is configured for coupling to a service provider network unit via a first network cable;
  - a local area network port that is configured for coupling to a second device via a second network cable;
  - a switch that is coupled to said local area network port, said wide area network port and an internal port of said voice over Internet protocol telephone, wherein said switch is configured to route voice over Internet protocol traffic that originates at said internal port to said wide area network port for delivery to said service provider network, said switch being further configured to support a gateway function in forwarding network traffic received at said wide area network to said local area network port for delivery to said second device via said second network cable; and
  - an authentication module that authenticates said voice over Internet protocol telephone with said service provider for registration of said voice over Internet protocol telephone to provide said gateway function, wherein said enabling of said gateway function is conditioned on said authentication.

18. The voice over Internet protocol telephone device of claim 17, wherein said authentication is one of a Layer 2 and Layer 3 authentication.

19. The voice over Internet protocol telephone device of claim 17, wherein said authentication is based on a media access control address authentication.

20. The voice over Internet protocol telephone device of claim 17, wherein said authentication is based on a username and password.

* * * * *